United States Patent
Hertz et al.

(10) Patent No.: US 8,466,640 B2
(45) Date of Patent: Jun. 18, 2013

(54) METHOD FOR SLOWING-DOWN CONTROL OF AN ASYNCHRONOUS MACHINE

(75) Inventors: Dirk Hertz, Fichtenhof (DE); Diethard Runggaldier, Stegaurach (DE); Stefan Zitzler, Schwandorf (DE)

(73) Assignee: Siemens Aktiengesellschaft, Munich (DE)

( * ) Notice: Subject to any disclaimer, the term of this patent is extended or adjusted under 35 U.S.C. 154(b) by 580 days.

(21) Appl. No.: 12/675,847

(22) PCT Filed: Aug. 12, 2008

(86) PCT No.: PCT/EP2008/060588
§ 371 (c)(1),
(2), (4) Date: Mar. 1, 2010

(87) PCT Pub. No.: WO2009/030584
PCT Pub. Date: Mar. 12, 2009

(65) Prior Publication Data
US 2010/0207554 A1    Aug. 19, 2010

(30) Foreign Application Priority Data
Sep. 3, 2007  (EP) ..................................... 07017244

(51) Int. Cl.
*H02P 3/10*  (2006.01)

(52) U.S. Cl.
USPC .......................................... 318/373; 318/362

(58) Field of Classification Search
USPC ................................................. 318/362, 373
See application file for complete search history.

(56) References Cited

U.S. PATENT DOCUMENTS

| | | | |
|---|---|---|---|
| 3,969,661 A * | 7/1976 | Morinaga et al. | 318/375 |
| 4,543,518 A * | 9/1985 | Guilloux | 318/757 |
| 5,627,710 A * | 5/1997 | Schoeffler | 361/23 |
| 6,002,225 A * | 12/1999 | Gleim et al. | 318/373 |
| 6,094,023 A * | 7/2000 | Ericsson | 318/362 |
| 6,385,522 B1 * | 5/2002 | Pugh | 701/70 |
| 6,803,737 B2 * | 10/2004 | Scheidegger et al. | 318/567 |

(Continued)

FOREIGN PATENT DOCUMENTS

| | | |
|---|---|---|
| DE | 87 07 425 U1 | 7/1987 |
| DE | 43 10 485 A1 | 10/1994 |
| WO | WO 01/71902 A1 | 9/2001 |

OTHER PUBLICATIONS

Anonymous: "Reduced stopping time with a soft starter"; LMPFORUM, [Online]; Sep. 12, 2005, XP002527582; gefunden im Internet: URL:http://www.1mpforum.com/inforum/Reduced-stopping-time-s-t797.html&pid=2360&mode=threaded, gefunden am May 12, 2009, 2. Beitrag, vorletzter Absatz; Others; 2009.

(Continued)

*Primary Examiner* — Kawing Chan
(74) *Attorney, Agent, or Firm* — Harness, Dickey & Pierce, P.L.C.

(57) ABSTRACT

A method is disclosed for slowing-down control of an asynchronous machine, wherein the value of a start energy is determined and stored while the asynchronous machine is being run up from being stationary to the operating rotation speed. The asynchronous machine is braked, in the reversing mode, with braking energy which corresponds to the start energy multiplied by a correction factor wherein the correction factor assumes a value between 0 and 1. In at least one embodiment, the asynchronous machine is braked further by DC braking after braking has been carried out in the reversing mode.

15 Claims, 1 Drawing Sheet

U.S. PATENT DOCUMENTS

| | | | |
|---|---|---|---|
| 7,122,982 B2* | 10/2006 | Sasaya et al. | 318/293 |
| 2001/0017235 A1* | 8/2001 | Suga et al. | 187/290 |
| 2003/0151380 A1* | 8/2003 | Akiyama et al. | 318/376 |
| 2003/0173919 A1 | 9/2003 | Altendorf et al. | |
| 2003/0192933 A1* | 10/2003 | Pedicini et al. | 227/131 |
| 2004/0207352 A1* | 10/2004 | Fritsch et al. | 318/437 |
| 2005/0127858 A1* | 6/2005 | Florea | 318/254 |
| 2005/0179410 A1* | 8/2005 | Jeong et al. | 318/66 |
| 2005/0194923 A1* | 9/2005 | Huang et al. | 318/701 |
| 2006/0055352 A1* | 3/2006 | Mori et al. | 318/432 |
| 2006/0138995 A1* | 6/2006 | Sugita et al. | 318/811 |
| 2008/0192402 A1* | 8/2008 | Mitlmeier et al. | 361/147 |
| 2008/0295543 A1* | 12/2008 | Brubaker et al. | 68/12.16 |
| 2008/0297089 A1* | 12/2008 | Fritsch et al. | 318/504 |
| 2010/0264867 A1* | 10/2010 | Iwashita et al. | 318/635 |

OTHER PUBLICATIONS

Plachetka S: "Mit oder gegen den Strom Drehstrommotoren sicher Bremsen", Elektronik, Bd. 76, Nr. 6, Jun. 13, 1994, Seiten 30-32, XP000438395, Vogel Verlag K.G. Würzburg, DE, ISSN: 1431-9578, Seite 1, Spalte 3—Seite 2, Spalte 1; Others; 1994; DE.

Plachetka S: "Zuverlässige Abbremsung von Drehstrommotoren, Teil 2", UND- ODER- NOR + STEUERUNGSTECHNIK, Bd. 25, Nr. 5, May 1, 1992, Seiten 26-27, XP000304462, Distribution Verlag GmbH, Mainz, DE, Seite 1, Spalte 2, Absatz 28—Absatz 31; Book; 1992.

\* cited by examiner

METHOD FOR SLOWING-DOWN CONTROL OF AN ASYNCHRONOUS MACHINE

PRIORITY STATEMENT

This application is the national phase under 35 U.S.C. §371 of PCT International Application No. PCT/EP2008/060588 which has an International filing date of Aug. 12, 2008, which designates the United States of America, and which claims priority on European application number EP 07017244, the entire contents of each of which are hereby incorporated herein by reference.

FIELD

At least one embodiment of the present application generally relates to a method for run down control of an asynchronous machine.

BACKGROUND

Asynchronous machines are widely used for various drive purposes. When an asynchronous machine is being started, it is of interest to limit the starting currents and the starting torque of the asynchronous machine, and to increase them slowly as the rotation speed of the asynchronous machine rises. Soft starting such as this is of interest for various technical applications. Soft starting can be achieved by controlling the electrical power which is supplied to the asynchronous machine. By way of example, the electrical power can be regulated by phase-gating control.

In particular asynchronous machines may be used to drive tools or machines with a high mass moment of inertia. For example, machines such as these may be planing machines, milling machines, circular saws etc., in the carpentry industry. For safety reasons, particularly for machines such as this, it is necessary for the run down after the machine has been switched off to be as short as possible. Typically, run down times of between 10 seconds and 20 seconds are required. The run down time of the asynchronous machine should at least be no longer than the run up time.

In order to brake an asynchronous machine, it is known for a DC voltage or a rectified AC voltage to be applied to two phases of the machine, in order to achieve a braking effect in this way. However, this so-called DC braking has various technical disadvantages. If the DC braking process for a machine is provided by pure direct current, then a direct-current source is required for this purpose. This is technically complex to implement. If the DC braking process is provided by a rectified AC voltage within phase-gating control, by in each case using only one half-cycle of the rectified voltage for DC braking (this corresponds in principle to half-wave rectification), then only a small braking torque can be produced because of the relatively short times during which current flows. Furthermore, the asymmetric current profiles cause losses within the asynchronous machine. For this reason, the required short run down times for machines or tools with very high mass moments of inertia frequently cannot be achieved simply by DC braking.

In order to achieve the required braking times, it is often essential to carry out a braking process using a frequency converter. However, frequency converters occupy valuable physical space, and are also expensive to obtain.

SUMMARY

At least one embodiment of the present invention specifies a method for run down control of an asynchronous machine which is better than that in the prior art by at least allowing effective braking of the asynchronous machine with less technical complexity.

At least one embodiment of the invention is in this case based on the idea of implementing the braking process such that the majority of the kinetic energy (rotation energy) of the running asynchronous machine is dissipated by braking the asynchronous machine in the reversing mode. When the asynchronous machine has been braked in the reversing mode, the remaining kinetic energy which is present (rotation energy) is dissipated by DC braking of the asynchronous machine. When the phases are reversed in comparison to the normal mode of the asynchronous machine, two of the three phases are interchanged with one another. Such reversing of the phases results in the stator of the asynchronous machine producing a magnetic rotating field which rotates in the opposite sense to the instantaneous direction of the rotor.

When the asynchronous machine is in the reversing mode, a large braking torque is exerted on the rotor of the asynchronous machine. However, one technical problem that arises during such a braking process is that the electrical energy which is supplied when the asynchronous machine is in the reversing mode should as accurately as possible be sufficiently high that the asynchronous machine and, if appropriate, further driven components come completely to rest. If the electrical energy supplied to the asynchronous machine in the reversing mode is greater than the rotation energy of the asynchronous machine including the rotation energy of the driven components, then the asynchronous machine may possibly move in the opposite direction to the original running direction at the end of the reversing mode. If the electrical energy supplied in the reversing mode of the asynchronous machine is less than the rotation energy of the asynchronous machine including the driven parts, then the asynchronous machine will not come completely to rest at the end of the reversing mode. Both of the situations described above are technically undesirable. In particular, both situations would fail to meet the required safety requirements.

Thus, on the basis of the idea according to at least one embodiment of the invention, the energy which is consumed when starting the asynchronous machine up to the point where the asynchronous machine reaches its operating rotation speed is measured. In this context, an operating rotation speed means a predetermined fixed rotation speed which is desired for operation of the asynchronous machine, and in particular the operating rotation speed may be the rated rotation speed of the asynchronous machine. In a corresponding manner, electrical energy is supplied during a subsequent braking process of the asynchronous machine in the reversing mode, which electrical energy is less than or equal to that energy which was consumed during starting of the asynchronous machine. This makes it possible to prevent the asynchronous machine from starting to run backward at the end of the reversing mode.

After the asynchronous machine has been braked in the reversing mode, it will have a residual rotation speed (residual rotation energy) which is dissipated by DC braking. In this case, a rectified alternating current is applied to two of the three phases of the asynchronous machine.

According to at least one embodiment of the invention, the method for run down control of an asynchronous machine should comprise the following:

the value of a start energy ($E_{start}$) when the asynchronous machine is being run up from rest to the operating rotation speed is determined and stored. The asynchronous machine is braked in the reversing mode with a braking energy ($E_{stop}$) which corresponds to the start energy ($E_{start}$) multiplied by a correction factor (δ), wherein the correction factor (δ) assumes a value between 0 and 1. After braking in the reversing mode, the asynchronous machine is braked further by DC braking.

In particular, the method according to at least one embodiment of the invention has at least one of the following advantages.

The method according to at least one embodiment of the invention makes it possible to safely brake an asynchronous machine in a predetermined time. In particular, an asynchronous machine which drives parts with large mass moments of inertia can be safely braked. There is advantageously no need for any converter for run down control of the asynchronous machine.

The method according to at least one embodiment of the invention for run down control of an asynchronous machine can accordingly also have the following features:

The correction factor may assume a value between 0.5 and 0.8 (0.5<δ<0.8). A correction factor (δ) with a value between 0.5 and 0.8 takes account of the friction losses which typically occur in an asynchronous machine. It is therefore particularly advantageous to choose the correction factor (δ) from the abovementioned interval.

DC braking can be terminated after a predetermined time period. Termination of DC braking after a predetermined time period prevents unnecessarily long DC braking. In particular, DC braking can be terminated after a time period after which there is a very high probability of the asynchronous machine having come completely to rest.

DC braking can be terminated on the basis of the detection of a current rise in the motor current during the DC braking process. The detected current rise in the motor current allows simple detection that the asynchronous machine is at rest. This makes it possible to ensure that the DC braking is terminated only after the asynchronous machine has come completely to rest.

When being run up from rest to the operating rotation speed or to a desired rotation speed, the asynchronous machine may be connected to a power source via a controller and a mains contactor. During braking, the asynchronous machine can be connected to the power source via a controller and a reversing contactor. At the start of the braking process, the asynchronous machine can be disconnected from the power supply by the controller. Furthermore, the electrical connection can be switched from the mains contactor to the reversing contactor, and the asynchronous machine can then be braked in the reversing mode, controlled by the controller, with a motor current which is controlled by phase gating and rises slowly.

The value of the start energy ($E_{start}$) can be determined by integration of the air-gap power ($P_{LSP}$) over the starting time ($t_{start}$) of the asynchronous machine. Alternatively, the value of the start energy ($E_{start}$) can be determined by summation of the air-gap power ($P_{LSP}$) over the number of mains cycles ($L_{start}$) for the starting of the asynchronous machine. The determination of the value of the start energy ($E_{start}$) as described above is particularly simple, effective and accurate.

The braking energy ($E_{stop}$) can be determined by integration of the air-gap power ($P_{LSP}$) over the stopping time ($E_{stop}$) of the asynchronous machine. Alternatively, the braking energy ($E_{stop}$) can be determined by summation of the air-gap power ($P_{LSP}$) over the number of mains cycles ($L_{stop}$) for the braking of the asynchronous machine. The determination of the braking energy ($E_{stop}$) as described above is particularly simple, effective and accurate.

BRIEF DESCRIPTION OF THE DRAWINGS

Further advantageous refinements of the method according to embodiments of the invention will become evident from the dependent claims which have not been referred to above, and in particular from the drawing. In order to explain the invention further, the following text refers to the drawings which schematically illustrate example embodiments. In this case:

DETAILED DESCRIPTION OF THE EXAMPLE EMBODIMENTS

Figure 1:
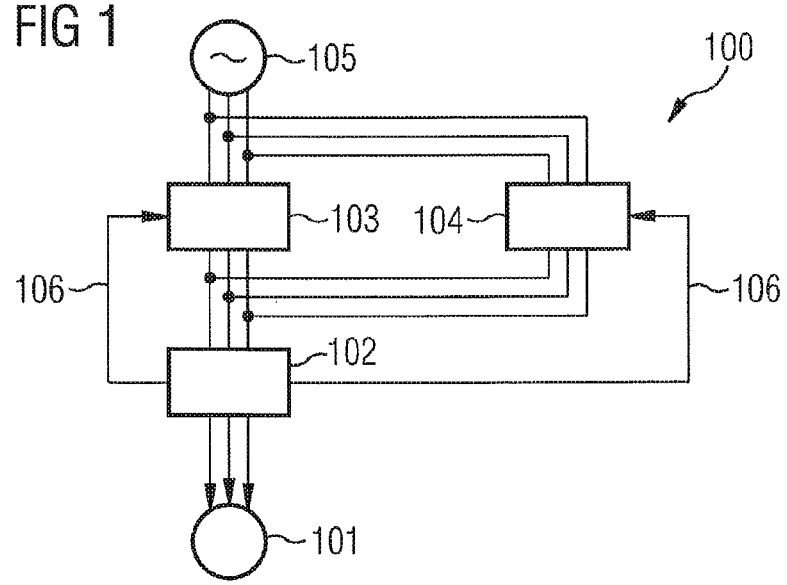
FIG. 1 shows an asynchronous machine with a device for run down control.

FIG. 1 shows a device 100 for run down control of an asynchronous machine 101. The device 100 comprises a controller 102, a mains contactor 103 and a reversing contactor 104. The mains contactor 103 can be connected or is connected on the input side to a power source 105. On the output side, the mains contactor 103 is connected to the controller 102, which is in turn connected to the asynchronous machine 101. The reversing contactor 104, which bridges the mains contactor 103, can be connected or is connected on the input side to the power source 104, and on the output side the reversing contactor is likewise connected to the controller 102. The mains contactor 103 and the reversing contactor 105 are connected to the controller 102 via control lines 106. The mains contactor 103 and the reversing contactor 104 can be switched by the controller 102.

In particular, the controller 102 may act as a soft starter. A soft starter makes it possible to limit both the starting currents and the starting torques of the asynchronous machine 101. For example, the asynchronous machine 101 can be run up slowly from rest to a desired operating rotation speed, in particular the rated rotation speed. In particular, a soft starter such as this can operate on the principle of phase-gating control. The controller 102 is likewise suitable for measuring and storing the electrical start energy ($E_{start}$). Furthermore, the controller 102 is suitable for controlling a DC braking process for the asynchronous machine 101. In this case, a rectified alternating current is applied to two of the three poles of the asynchronous machine 101. In order to achieve a DC braking process which starts softly, this process can be regulated in the form of phase-gating control.

In particular, the asynchronous machine 101 may be used for driving tools or machines with high mass moments of inertia. For example, the asynchronous machine 101 may drive a planing machine, a milling machine or circular saw in the carpentry industry.

During starting, the asynchronous machine 101 is connected via the mains contactor 103 and the controller 102 to the power source 105. While the asynchronous machine 101 is being accelerated to its operating rotation speed, the electrical start energy ($E_{start}$) supplied to the asynchronous machine 101 is measured and stored. The start energy ($E_{start}$) is measured and stored with the aid of the controller 102.

The start energy ($E_{start}$) is calculated as the integral of the air-gap power $P_{LSP}$ supplied to the asynchronous machine 101 over the starting time ($t_{start}$) (cf. equation 1).

$$E_{start} = \int_{t_{start}} P_{LSP} \quad (1)$$

The air-gap power ($P_{LSP}$) is used for this purpose since the value of the mechanical power is not directly available for measurement. There is a difference between the electrical power and the mechanical power, caused by various losses. In particular, friction losses as well as resistive and inductive losses in the stator and rotor of the asynchronous machine contribute to the losses. Since the stator losses are in general known, the power in the air gap between the stator and the rotor (air-gap power $P_{LSP}$) can be calculated well, and is therefore used in the following text as a reference variable.

The air-gap power ($P_{LSP}$) supplied to the asynchronous machine 101 is therefore calculated as the difference between the electrical power ($P_{el}$) supplied to the asynchronous machine 101 and the power loss ($P_v$) in the stator of the asynchronous machine 101 (cf. equation 2).

$$P_{LSP} = P_{el} - P_v \quad (2)$$

Equation 3 reflects the calculation of the air-gap power ($P_{LSP}$), wherein the electrical power ($P_{el}$) and the power loss ($P_v$) in the stator of the asynchronous machine 101 are in each case added up over one mains cycle. ($S_p$) denotes the number of sample values per mains cycle.

$$P_{LPS} = \sqrt{3}\,\frac{1}{S_p}\sum_{i=1}^{S_p}(U_i I - I_i^2 R) \quad (3)$$

As an alternative to the integration of the air-gap power ($P_{LSP}$) over the starting time ($t_{start}$) as indicated in equation 1, the start energy ($E_{start}$) can be calculated by addition over the number of mains cycles ($L_{start}$) for starting the asynchronous machine 101 (cf. equation 4).

$$E_{start} = \sum_{p=1}^{L_{start}}\left(\sqrt{3}\,\frac{1}{S_p}\sum_{i=1}^{S_p}(U_i I - I_i^2 R)\right) \quad (4)$$

Once the asynchronous machine 101 has been run up to the desired rotation speed, the value determined for the start energy ($E_{start}$) is stored by the controller 102.

Before the asynchronous machine 101 is actually braked, it is disconnected from the electrical power supply by the controller 102. By way of example, this can be done by a thyristor circuit which is controlled by the controller 102. The electrical connection between the controller 102 and the polyphase power source 105 is then switched from the mains contactor 103 to the reversing contactor 104. After switching, the reversing contactor 104 bridges the mains contactor 103.

In the reversing mode, the sequence of the phases at the asynchronous machine 101 is interchanged. Such reversing of the phases produces a rotating field in the stator of the asynchronous machine 101 in the opposite rotation sense to the instantaneous rotation direction of the rotor of the asynchronous machine 101. The mutually opposing rotating fields of the stator and of the rotor of the asynchronous machine 101 result in a large braking torque on the rotor of the asynchronous machine 101.

The reversing braking process that is achieved in this way has a current profile without any gaps, in comparison to DC braking using a rectified alternating current, and thus ensures a comparatively considerably greater braking torque. Braking the asynchronous machine 101 in the reversing mode at the same time overcomes the risk of the asynchronous machine 101 being accelerated again rather than braked by the DC braking process.

There is a risk of renewed acceleration of the asynchronous machine 101 if it is braked using a rectified alternating current as the DC braking current. The braking energy ($E_{stop}$) which is supplied in the reversing mode is chosen to be sufficiently great that the asynchronous machine 101 still continues to run on slightly at the end of the braking process, but never rotates in the opposite rotation direction to the original (reverse running).

The braking energy ($E_{stop}$) can be determined in the same way that the start energy ($E_{start}$) was determined (cf. equation 4). Equation 5 indicates an analogous possible way to determine the braking energy ($E_{stop}$).

$$E_{stop} = \sum_{p=1}^{L_{stop}}\left(\sqrt{3}\,\frac{1}{S_p}\sum_{i}^{S_p}(U_i I - I_i^2 R)\right) \quad (5)$$

In the ideal, the braking energy ($E_{stop}$) would be identical to the start energy ($E_{start}$). In this case, the asynchronous machine 101 would be precisely stationary at the point at the end of the braking process in the reversing mode. However, because of various influencing variables, such as friction losses, proximity errors, sampling errors or temperature-dependent variation of the stator resistance, it is highly probable that the braking energy ($E_{stop}$) required will not be equal to the start energy ($E_{start}$). The braking energy ($E_{stop}$) used to brake the asynchronous machine 101 is therefore calculated using formula 6.

$$E_{stop} = \delta \cdot E_{start} \quad (6)$$

In order to calculate the braking energy ($E_{stop}$), a factor between 0 and 1, and ideally a factor between or equal to 0.5 and 0.8 ($0 < \delta < 1$; $0.5 \leq \delta \leq 0.8$) is applied to the start energy ($E_{start}$). Experiments or an adjustment run in the specific case can be used to determine an optimum range or an optimum value for $\delta$.

In order to brake the asynchronous machine 101 further after a braking energy ($E_{stop}$) according to formula 6 has been applied to it, a rectified alternating current is applied to two phases of the asynchronous machine 101 in such a way that the residual rotation speed of the asynchronous machine 101 is dissipated by DC braking until the machine finally comes to rest.

Figure 2:
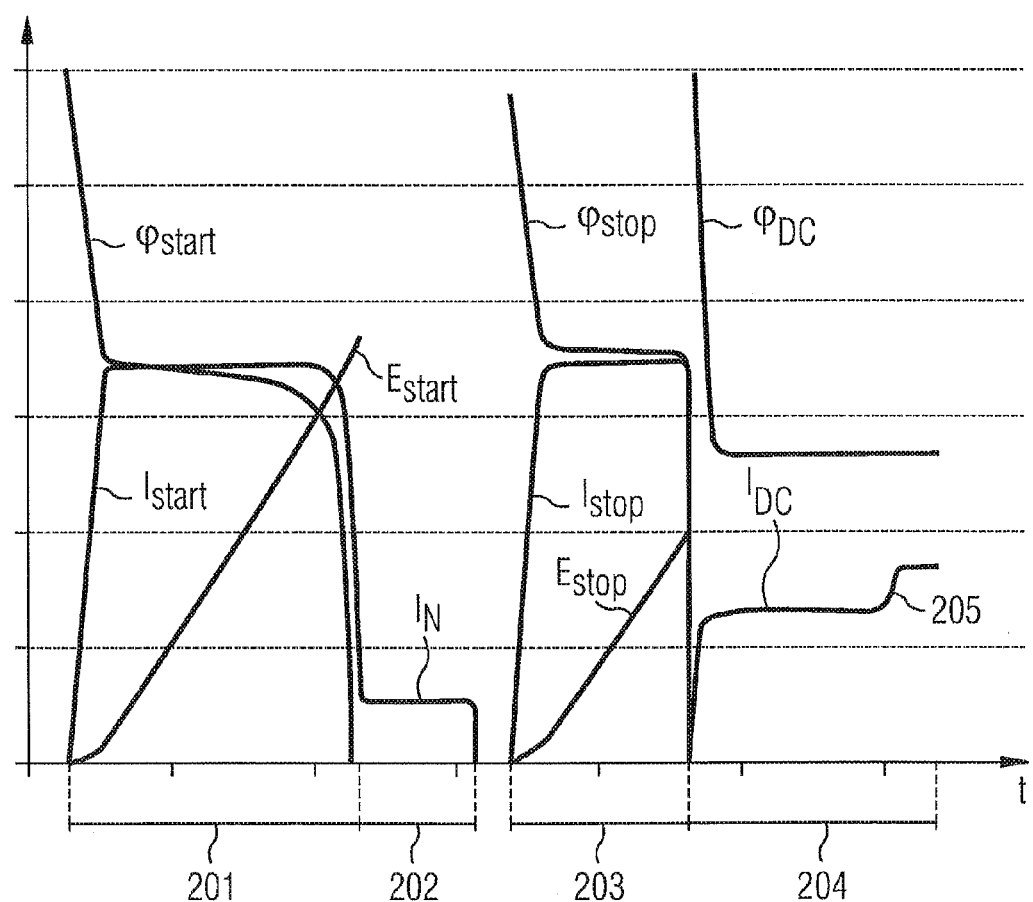
FIG. 2 shows current profiles on the asynchronous machine during the starting phase and during the braking phase of the asynchronous machine.

FIG. 2 shows the time profiles of the start energy ($E_{start}$), of the start current ($I_{start}$) and of the phase gating ($\phi_{start}$) as a function of the time t. The values of the abovementioned variables are shown in FIG. 2, using arbitrary units plotted against the time t. The profiles $E_{start}$, $I_{start}$ and $\phi_{start}$ are shown both for the time 201 in which the asynchronous machine 101 is running up and for the time 202 in which the asynchronous machine 101 is running at its operating rotation speed.

In order to start the asynchronous machine 101 from rest, the phase gating ($\phi_{start}$) is controlled by the controller 102 such that the motor current ($I_{start}$) rises slowly to a predetermined limit value during the starting phase 201. A value such as this, which can be seen by a plateau in the motor current ($I_{start}$) in FIG. 2, is typically 3 to 5 times the rated load of the asynchronous machine 101. At the time at which the asynchronous machine 101 reaches its operating rotation speed, the phase gating ($\phi_{start}$) decreases to zero, and the motor current ($I_{start}$) reaches a plateau value ($I_N$) at which the asynchronous machine 101 is operated at the operating rotation speed.

The asynchronous machine can likewise be started by a linear phase-gating ramp, and in this case the motor current is not limited to fixed plateau value. This also applies to any braking of the machine. The asynchronous machine can always be both started and braked by both possible methods, that is to say limiting of the motor current to a predetermined value, and a linear phase-gating ramp.

During the time 201 in which the asynchronous machine 101 is being run up, the energy consumed to accelerate the asynchronous machine 101 up to the operating rotation speed is continuously measured by the controller 102. The added or integrated maximum value of the start energy ($E_{start}$) is stored by the controller 102, once the asynchronous machine 101 has reached the operating rotation speed.

In order to brake the asynchronous machine 101, it is first of all disconnected from the power source 105 by the controller 102. Once the connection between the power source 105 and the controller 102 has been switched from the mains contactor 103 to the reversing contactor 104, the asynchronous machine 101 has a slowly rising motor current ($I_{stop}$) applied to it in the reversing mode. During this process, the phase gating ($\phi_{stop}$) can be regulated, for example, such that the motor current ($I_{stop}$) rises slowly during the time 203 in the reversing mode up to about 3 to 5 times the value of the rating of the asynchronous machine 101.

During the time period in the reversing mode, the asynchronous machine 101 is supplied with less electrical energy ($E_{stop}$) than the start energy ($E_{start}$). In this case, in particular, a braking energy ($E_{stop}$) which corresponds to approximately 50% to 80% of the start energy ($E_{start}$) is applied to the asynchronous machine 101. As indicated by equation 6, δ is approximately between 0.5 and 0.8.

After the end of the reversing mode, the asynchronous machine 101 will have a residual amount of kinetic energy in the form of a residual rotation speed. For this reason, the reversing mode is ideally followed seamlessly by a DC braking phase 204. During DC braking, two phases of the asynchronous machine 101 have a rectified AC voltage applied to them.

In order to ensure that the DC braking process start softly, the phase gating ($\phi_{DC}$) is also changed during DC braking from an initially high value to a predetermined value, in the extreme down to 0. In consequence, the braking current ($I_{DC}$) which is applied to the asynchronous machine 101 rises slowly.

The DC braking current ($I_{DC}$) which is applied to the asynchronous machine 101 has a peak 205 when the asynchronous machine 101 is at rest. The fact that the asynchronous machine 101 is at rest can be detected from the increase 205 in the DC braking current ($I_{DC}$) applied to the asynchronous machine 101.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A method for run down control of an asynchronous machine, comprising:
    determining and storing a value of a start energy during a run up of the asynchronous machine from rest up to an operating rotation speed;
    braking the asynchronous machine in a reversing mode with a braking energy determined by the start energy multiplied by a correction factor, wherein the correction factor assumes a value between 0 and 1; and
    further braking the asynchronous machine by DC braking after the braking in the reversing mode.

2. The method as claimed in claim 1, wherein the correction factor assumes a value between 0.5 and 0.8.

3. The method as claimed in claim 2, further comprising terminating the DC braking after a time period.

4. The method as claimed in claim 2, further comprising terminating the DC braking on the basis of a detection of a current rise in a profile of a DC braking current.

5. The method as claimed in claim 2, wherein the asynchronous machine is connected to a power source during run up via a mains contactor and a controller, and is connected to the power source via a reversing contactor and the controller during braking, the method further comprising:
    disconnecting the asynchronous machine from the power source by the controller at the start of braking;
    switching the connection between the power source and the controller from the mains contactor to the reversing contactor;
    braking the asynchronous machine with a motor current in the reversing mode, controlled by the controller, the motor current being controlled by phase gating and rising up to a value.

6. The method as claimed in claim 1, further comprising terminating the DC braking after a time period.

7. The method as claimed in claim 1, further comprising terminating the DC braking on the basis of a detection of a current rise in a profile of a DC braking current.

8. The method as claimed in claim 1, wherein the asynchronous machine is connected to a power source during run up via a mains contactor and a controller, and is connected to the power source via a reversing contactor and the controller during braking, the method further comprising:
    disconnecting the asynchronous machine from the power source by the controller at the start of braking;
    switching the connection between the power source and the controller from the mains contactor to the reversing contactor;
    braking the asynchronous machine with a motor current in the reversing mode, controlled by the controller, the motor current being controlled by phase gating and rising up to a value.

9. The method as claimed in claim 1, wherein the value of the start energy is determined by integration of an air-gap power over a starting time of the asynchronous machine.

10. The method as claimed in claim 1, wherein the value of the start energy is determined by summation of an air-gap power over a number of mains cycles for the starting of the asynchronous machine.

11. The method as claimed in claim 1, wherein the braking energy is determined by integration of the air-gap power over the stopping time of the asynchronous machine.

12. The method as claimed in claim 1, wherein the braking energy is determined by summation of the air-gap power over a number of mains cycles for the braking of the asynchronous machine.

13. The method as claimed in claim 1, wherein the asynchronous machine is a three-phase asynchronous machine and braking includes reversing two of the three phases.

14. The method as claimed in claim 1, wherein the operating rotation speed is a fixed rotation speed at which the asynchronous machine is rated to operate.

15. The method as claimed in claim 1, wherein the correction factor is based on at least one of friction losses, proximity errors, sampling errors, and temperature-dependent variation of the stator resistance.

* * * * *